United States Patent
Fujii et al.

[11] 3,750,546
[45] Aug. 7, 1973

[54] ELECTRIC SHUTTER OPERATING CIRCUIT

[75] Inventors: Masaya Fujii, Tokyo; Osamu Tchihashi, Hamamatsu, both of Japan

[73] Assignee: Yashica Company, Ltd., Tokyo, Japan

[22] Filed: June 10, 1971

[21] Appl. No.: 151,720

[52] U.S. Cl. .................................. 95/10 CT
[51] Int. Cl. ................................... G03b 7/08
[58] Field of Search ............... 95/10 CT; 250/214 P

[56] References Cited
UNITED STATES PATENTS

| | | | |
|---|---|---|---|
| 3,683,766 | 8/1972 | Nobusawa | 95/10 CT |
| 3,633,473 | 1/1972 | Yashuhiro | 95/10 CT |
| 3,648,053 | 3/1972 | Sato | 95/10 CT |

Primary Examiner—Samuel S. Matthews
Assistant Examiner—Russell E. Adams, Jr.
Attorney—Flynn & Frishauf

[57] ABSTRACT

An external electromotive element is disposed in front of the camera. An internal electromotive element is disposed in a position to receive the light transmitted through the lens, for through-the-lens metering. A first capacitor is charged from a source of constant voltage through the internal and external electromotive elements to store a voltage representative of the ratio of externally and internally measured light. A switch, interlocked with the shutter release button connects the output of the first capacitor to the one input of a differential amplifier and connects the external electromotive element, with its polarity reversed, to the second input of the differential amplifier concurrently with the opening of the shutter. A second capacitor is charged in accordance with the output from the differential amplifier and a shutter control circuit is responsive to a predetermined terminal voltage of the second capacitor to close the shutter.

5 Claims, 2 Drawing Figures

ELECTRIC SHUTTER OPERATING CIRCUIT

BACKGROUND OF THE INVENTION

This invention relates to an operating circuit for electric camera shutters to automatically determine the shutter speed of a single lens reflex type (SLR) camera in response to the brightness of an object to be photographed, and more particularly to an electric shutter operating circuit wherein the exposure time is determined according to the quantity of light transmitted through the lens system of the camera.

Systems have been proposed which function to measure the brightness or lumens near the photosensitive surface by means of a photoconductive element disposed in the body of a camera on the optical axis of the lens. Such systems make it possible to accurately measure the lumens at the focal plane, even when the lenses were changed, or different photographic film is used.

In cameras of this type it is necessary to retract the photoconductive element from the optical axis at the moment when the shutter is opened. For this reason, it is necessary to memorize the measured value of the light at a given time before opening of the shutter in order to provide for later appropriate shutter timing, that is, to control the interval during which the shutter is held open.

According to one such system (see U.S. Pat. No. 3,324,779) the value of the light is measured by the photoconductive element while it is being positioned on the optical axis before opening of the shutter. This measured value is stored in a capacitor so as to, later, determine a shutter time corresponding to stored value. This system can store the measured value of the light with relatively simple apparatus. The light value stored, however, is the value of the light before the shutter is opened and does not represent the value of the light during the interval in which the shutter is actually open. Accordingly, the exposure may not be correct if the actual brightness, at the time the shutter opens, is different from the stored measured value, especially when the brightness of the object varies.

It was proposed to eliminate the defect of this first system by providing besides an internal photoconductive element arranged on the optical axis of an objective lens, an external photoconductive element including an iris diaphragm and positioned in front of the camera body. A bridge circuit which includes the internal and external photoconductive elements controls the reversible motor. The motor controls the iris diaphragm in front of the external photoconductive element to cause the bridge to restore the balanced condition. The external photoconductive element is connected to a shutter speed determining circuit at the time of taking a picture. This system is complicated and expensive; it requires an iris diaphragm for adjusting the quantity of light incident upon the external photoconductive element positioned in front of the camera and a motor for operating the iris diaphragm, resulting in a bulky structure. In addition, it is necessary to provide a power source to operate the motor controlling the iris diaphragm. The control cycle is slow, since the motor is part of the control loop, i.e., the motor operated iris diaphragm balances the bridge circuit. Cameras utilizing such shutter operating systems have not found acceptance.

It is an object of the invention to provide an improved electronic shutter control system which can utilize through-the-lens metering and can accurately determine the brightness of the object even while the shutter is opened to correctly control exposure time. Such a system should also be compact and free from movable parts such as an iris diaphragm or a driving motor.

SUBJECT MATTER OF THE INVENTION

Briefly, the electric shutter operating circuit for a camera has an external photosensitive electromotive element disposed in front of the body of the camera, and an internal photosensitive electromotive element disposed at a position to receive the light transmitted through the lens of the camera to provide for through-the-lens metering. The circuit is powered by a source of constant voltage. A first capacitor is charged from the source of constant voltage through the internal and external electromotive elements which are connected in series opposition. A differential amplifier detects the balance condition between its inputs. When the shutter is open, so that the internal photosensitive element cannot be used, a switch connects the output of the first capacitor to the first input of the differential amplifier and the external electromotive element, with its polarity reversed, to the second input of the differential amplifier. A second capacitor is charged in accordance with the output from the differential amplifier, and a shutter control circuit, responsive to a predetermined terminal voltage of the second capacitor, closes the shutter.

The switch is interlocked with the shutter release button such that when the shutter release button is depressed slightly the switching means is operated to one operating position to connect the first capacitor to the source of constant voltage through the internal and external electromotive elements. When the shutter release button is depressed further to open the shutter, the switch is operated to another operating position to connect the capacitor and the external electromotive element to the differential amplifier.

BRIEF DESCRIPTION OF THE DRAWINGS

Further objects and advantages of the invention can be more fully understood from the following description taken in conjunction with the accompanying drawings in which.

DESCRIPTION OF THE PREFERRED EMBODIMENT

Figure 1:
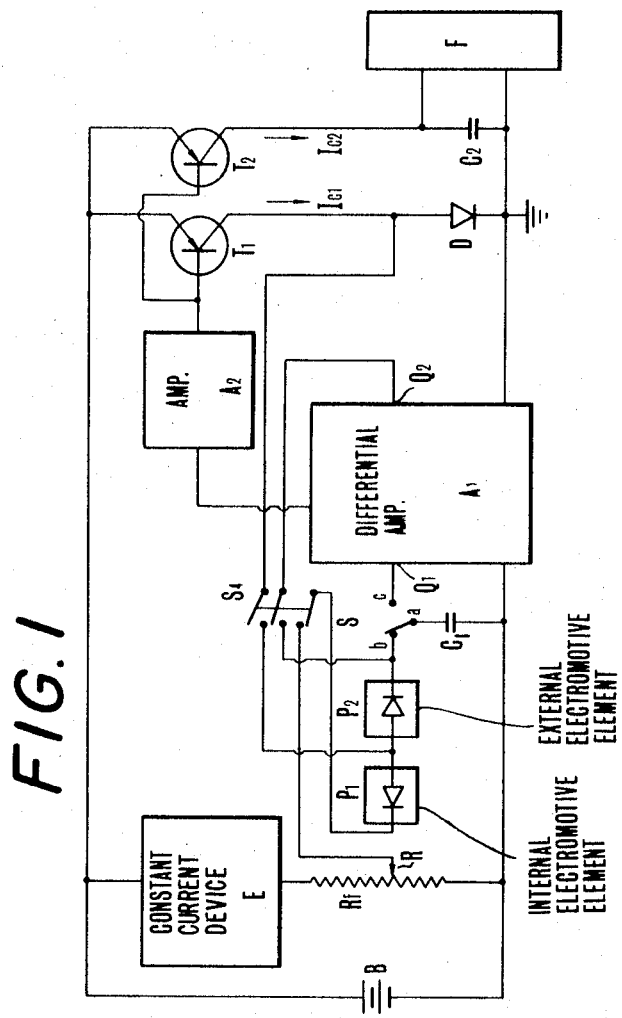
FIG. 1 is a block diagram to explain the principle of the novel electric shutter operating circuit and FIG. 2 shows a detailed connection diagram of one example of the novel electric shutter operating circuit.

A preferred embodiment diagrammatically shown in FIG. 1 of the accompanying drawing comprises a source B, a battery for example, and a series circuit connected across the source and including a constant voltage device E and a variable resistor $R_f$. An internal electromotive element $P_1$, disposed at a position which receives light transmitted through a camera lens and an external electromotive element $P_2$ positioned in front of the camera body are connected in series between the movable arm R of the variable resistor $R_f$ and a stationary contact B of a switch S. These electromotive elements may be solar cells, for example. The movable contact $a$ of switch S is connected to contact $b$ when the shutter release button (not shown) of the camera is depressed slightly, concurrently with the opening motion of the shutter, the movable contact is brought to neutral position and then to terminal C when the shutter is closed. A capacitor $C_1$ is connected to the movable contact $a$ to be charged with the difference between the outputs of the internal and external electromotive elements $P_1$ and $P_2$. Another stationary contact $c$ of the switch S is connected to a first input $Q_1$ of a differential amplifier $A_1$ having a high input impedance, the second input $Q_2$ of the differential amplifier $A_1$ being connected to the external electromotive element $P_2$ which is connected in the circuit by means of a switch $S_4$ at the same time when the movable contact $a$ of the switch S is transferred to contact $c$. The output from the differential amplifier $A_1$ is applied over amplifier $A_2$, to the base electrodes of first and second transistors $T_1$ and $T_2$. The collector of transistor $T_1$ is grounded through a forward diode D. The collector of a second transistor $T_2$ is connected to the ground through a capacitor $C_2$ which is charged by a current corresponding to the brightness of an object. A shutter control circuit F is connected across the capacitor $C_2$ to close the previously mechanically opened shutter, when the voltage across capacitor $C_2$ reaches a predetermined value.

OPERATION

When the shutter release button, not shown, is depressed slightly, the movable contact $a$ of switch S is connected to contact $b$ while at the same time elctromotive elements $P_1$ and $P_2$ generate outputs in response to the bright from the object. The current I flowing through a conventional electromotive element is expressed by the following equation $$I = I_0 \{\exp(qv/kT) - 1\} - I_L \tag{1}$$

where $I_0$ : saturating current
$q$ : charge quantity of electron
$V$ : the terminal voltage of the element
$K$: Boltzman constant
$I_L$ : photocurrent
$T$: absolute temperature (°K)

Accordingly, when the electromotive element is connected to a circuit of a high input impedance, the current I flowing through the element is negligibly small. Under a condition of $I_L > I_0$ (this condition is satisfied whenever light impinges upon the element), the terminal voltage of the electromotive element is given by $$V = kT/q \, \text{loge} \, I_L/I_0 \tag{2}$$

Accordingly, when the internal electromotive element $P_1$ and the external electromotive $P_2$ are connected in series opposition as shown in FIG. 1. The voltage $V_{p_1p_2}$ across these elements is given by $$V_{p_1p_2} = V_{p_1} - V_{p_2} = kT/q \, \{\text{loge} \, IL_{p_1}/I_{op_1} - \text{loge} \, IL_{p_2}/I_{op_2}\} \tag{3}$$

where $V_{p_1}$ : the terminal voltage across element $P_1$
$V_{p_2}$ : the terminal voltage across element $p_2$ Thus, when elements $P_1$ and $p_2$ have the same rating, then $I_{op_1} = I_{op_2}$ and equation 3 can be rewritten as follows $$V_{p_1p_2} = V_{p_1} - V_{p_2} = kT/q \, \text{loge} \, IL_{p_1}/IL_{p_2} \tag{4}$$

As the photocurrents $IL_{p_1}$ and $IL_{p_2}$ correspond to the brightness of the light impinging upon elements $P_1$ and $p_2$, respectively, the voltage $V_{p_1p_2}$ is proportional to the ratio of the brightness in front of the camera body to that near the photosensitive medium.

Upon application of the output from the constant voltage device E to variable resistor $Rf$, a voltage VR is produced between its movable arm R and the ground. The voltage VR is impressed upon capacitor $C_1$ through the internal and external electromotive elements $p_1$ and $p_2$. Accordingly, the voltage $Vc_1$ across capacitor $C_1$ is given by the following equation :

$$Vc_1 = kT/q \, \{\text{loge} \, IL_{p_2}/IL_{p_1} + n\text{loge}\} \tag{5}$$

When the shutter release button is depressed further the movable contact $a$ is switched to contact $c$ concurrently with the opening of the shutter. The capacitor $C_1$ is connected to the first input $Q_1$ of differential amplifier $A_1$ and the external electromotive element $P_2$ is connected between the second input $Q_2$ of differential amplifier $A_1$ and the first transistor $T_1$ by closing of switch $S_4$, with a polarity to apply a negative potential to the differential amplifier. When capacitor $C_1$ is connected to the first input $Q_1$ of the differential amplifier $A_1$ and when the external electromotive element $P_2$ is connected to the second input $Q_2$ with illustrated polarity, the differential amplifier produces an output proportional to the difference between the two inputs applied to the first and second inputs. This output is amplified by amplifier $A_2$ and is then supplied to the base electrodes of the first and second transistors $T_1$ and $T_2$. A a current corresponding to the output of amplifier $A_2$ flows through the emitter-collector circuit of the first transistor $T_1$ and diode and, a voltage drop VD is produced across diode D. The difference between this voltage drop VD and the voltage $V_{p_2}$ generated by the external electromotive element $p_2$ is applied to the second input $Q_2$ of the differential amplifier $A_1$. Where the second input is larger than the first input, the differential amplifier $A_1$ decreases its output thereby reducing the output from amplifier $A_2$ and the collector current $Ic_1$ of the first transistor $T_1$. As a result, voltage drop VD across diode D decreases to decrease the difference voltage $VD - V_{p_2}$ applied to the second input $Q_2$ of the differential amplifier $A_1$. On the other hand when the second input is smaller than the first input the output from the differential amplifier $A_1$ increases to increase the output from amplifier $A_2$ and the collector current $Ic_1$ of the first transistor $T_1$. Concequently, the difference voltage $VD - V_{p_2}$ applied to the second input of the differential amplifier $A_1$ increases. The differential amplifier $A_1$ will reach reaches a balanced comdition wherein the first input equals the second input when a condition $VD - V_{p_2} = Vc_1$ is satisfied. This operation is performed almost instantaneously. The voltage drop VD across diode D at this time is given by the following equation.

$$Vp_1 - Vp_2 + VR = VD - Vp'_2$$

$$VD = (Vp_1 - Vp_2 + VR) + Vp'_2$$

$$VD = -kT/q \{\log_e ILp_1/ILp_2 + n \log_e 2 + \log_e Ip'_2/I_0\}$$

$$= -kT/q\{\log_e ILp_1/ILp_2 \cdot 2^n \cdot ILp'_2/I_0\}$$

(6)

where $ILp'_2$ is the photocurrent of the external cell after the shutter is open. The current $ID$ flowing through diode $D$ when the voltage drop $VD$ appears across diode $D$ is given by $$ID = I_0D \, \mathrm{lxp} \, qVD/kT$$

$$= I_0D/I_0 \cdot ILp_1/ILp_2 \cdot 2^n \cdot ILp'_2$$

(7)

where $I_0$ represents the saturating current of the electromotive element $p_2$, $I_0D$ the saturating current of diode $D$. Although these values vary with temperature, temperature variation does not affect the ratio $I_0D/I_0$. The diode current $ID$ shown in equation 7 is determined by the collector current $Ic_1$. Accordingly, when first and second transistors $T_1$ and $T_2$ have the same rating, the diode current $ID$ will be substantially equal to the collector current $Ic_2$ of the second transistor $T_2$. The collector currents $Ic_1$ and $Ic_2$ of the first and second transistors are determined by their base currents and not affected much by the magnitude of load and the emitter-collector voltages. Consequently, the current $Ic_2$ flowing through capacitor $C_2$ connected to the collector electrode of the second transistor $T_2$ will be equal or proportional to the collector current $Ic_1$ of the first transistor $T_1$. For this reason, the voltage $Vc_2$ across capacitor $C_2$ builds-up substantially linearly as shown by the following equation $$Vc_2 = Ic_2/C_2 \, t = ID/C_2 \, t \text{ where } t \text{ is the time after the shutter is operated to open.}$$

(8)

By substituting equation 8 into equation 7 we obtain $$Vc_2 = A/C_2 \cdot I_0D/I_0 \cdot ILp_1/ILp_2 \cdot 2^n \cdot ILp'_2$$

(9)

Since $C_2$, $I_0D/I_0$ $ILp_1/ILp_2$ and $2^n$ are all constant we obtain $$Vc_2 = A \cdot ILp'_2 \cdot t$$

(10)

where A is constant

Consequently, when the voltage of capacitor $C_2$ is applied to the shutter control circuit $F$, the shutter will be closed when the capacitor voltage reaches a desired value. In this manner, the shutter is held opened from the time at which the movable contact $a$ of switch $S$ is closed to contact $b$ to an instant when the terminal voltage of capacitor $C_2$ reaches the desired value. This interval concides with the charging time of capacitor $C_2$ and is proportional to the ratio of the outputs of the external and internal electromotive elements $p_2$ and $p_1$ multiplied by the output of the external electromotive element $p_2$, or the lumens of the light impinging thereon at the moment of photographing.

With the shutter opening circuit described hereinabove by multiplying the ratio between the external brightness and the internal brightness before photographing with a value representing the external brightness at the time of photographing it is possible to determine the exact valve of the internal brightness at the time of photographing.

Figure 2:
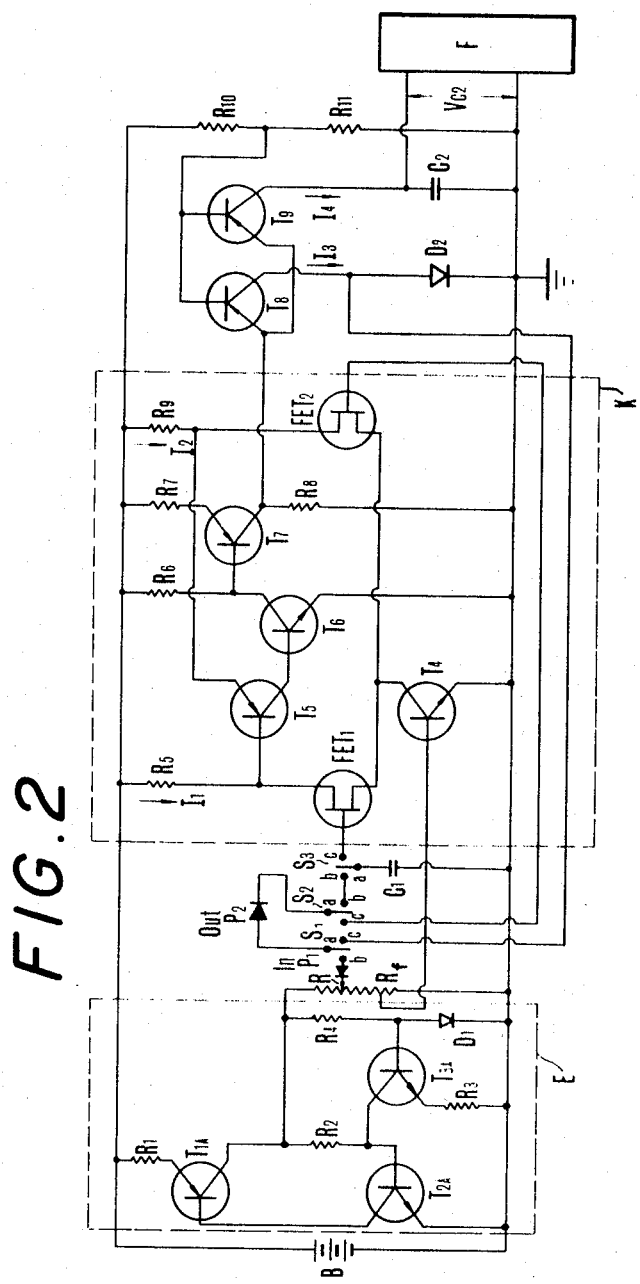

FIG. 2 shows a detailed connection diagram of one embodiment of the electric shutter operating circuit embodying the invention. In this figure three transistors $T_{1A}$, $T_{2A}$ and $T_{3A}$ comprise the constant voltage device $E$ of the well known construction, four transistors $T_4$, $T_5$, $T_6$ and $T_7$ comprise a portion of a differential amplifier circuit $K$, and field effect transistors $FET_1$ and $FET_2$ comprise another portion of the differential amplifier circuit. The output from transistor $T_7$ is connected to two parallel connected transistors $T_8$ and $T_9$. The connections between transistors $T_8$ and $T_9$ and diode $D_2$, capacitor $C_2$ and shutter control circuit F are similar to those shown in FIG. 1. Switches $S_1$, $S_2$ and $S_3$ interlocked with the shutter release button not shown, are provided to change the connection between the internal electromotive element $p_1$, the external electromotive element $p_2$, capacitor $C_1$ and the field effect transistor $FET_1$ in a manner to be described.

In the following description, it is assumed that the sliding arm $R$ of variable resistor $Rf$ connected to the output of the constant voltage device $E$ is fixed in order to simplify the description. When the shutter release button is depressed a little, movable contacts $a$ of switches $S_1$, $S_2$ and $S_3$ are thrown to their stationary contacts $b$ to establish a circuit extending from the slidable arm $R$ to capacitor $C_1$ through internal and external electromotive elements $p_1$ and $p_2$ to charge capacitor $C_1$. As above described, the terminal voltage of capacitor $C_1$ is expressed by a equation $Vc_1 = Vf + Vp - Vp_2$ and is proportional to the difference between the outputs $Vp_1$ and $Vp_2$ of two electromotive elements, when $Vf$ represents the voltage between the slidable arm $R$ of the variable resistor $Rf$ and the ground.

When the shutter release button is depressed further, concurrent with the opening of the shutter, not shown, the movable contacts $a$ of switches $S_1$, $S_2$ and $S_3$ are switched to their stationary contacts $c$ to connect the external electromotive element $p_2$ between the gate electrode of field effect transistor $FET_2$ and the collector electrode of transistor $T_8$.

When capacitor $C_1$ is connected to the gate electrode of field effect transistor $FET_1$, and when the external electromotive element $p_2$ is connected to the gate electrode of field effect transistor $FET_2$ as above described, the terminal voltage of capacitor $C_1$ is impressed upon the gate electrode of transistor $FET_1$ and the sum of the voltage drop $VD$ across diode $D_2$ caused by the collector current of transistor $T_8$ and the output voltage $Vp_2$ of the external electromotive element $p_2$ is impressed upon the gate electrode of field effect transistor $FET_2$.

In the case where $VD > Vp_2$ the voltage $V_2$ which is the difference $VD - Vp_2$ is positive because $VD$ is positive whereas $Vp_2$ is negative with respect to the field effect transistor $FET_2$. Then the gate voltage $V_2$ of the field effect transistor $FET_2$ is higher than the input voltage $V_1$ of the field effect transistor $FET_1$ or the terminal voltage of capacitor $C_1$ with the result that the load current of the field effect transistor $FET_2$ becomes larger than the load current $I_1$ of the other field effect transistor $FET_1$. Consequently, the base voltage of transistor $T_5$ given by the difference $I_1R_5 - I_2R_9$ decreases the output of transistor $T_5$. This, in turn, reduces the output of transistor $T_6$ having its having its base electrode connected to the collector electrode of transistor $T_5$, and the output of transistor $T_7$ having its base electrode connected to the collector electrode of transistor $T_6$. Consequently, the collector currents $I_3$ and $I_4$ of transistors $T_8$ and $T_9$ with their emitter electrodes connected to the collector electrode of transistor $T_7$ decrease. Decrease in the collector current $I_3$ decreases the voltage drop $VD$ across diode $D_2$ to decrease the voltage $V_2 = VD - Vp_2$ impressed upon the gate electrode of field effect transistor $FET_2$.

Conversely, when the voltage $V_2 = VD - Vp_2$ is lower than the first input voltage $V_1$, due to the decrease in the load current $I_2$ of the field effect transistor $FET_2$ the base voltage $I_1R_5 - I_2R_9$ of transistor $T_5$ increases than that of the prior case whereby the outputs from transistors $T_6$ and $T_7$ increase. This causes increase in the collector current $I_3$ of transistor $T_3$ to increase the voltage drop $VD$ across diode $D$ thus increasing the gate voltage $V_2$ of field effect transistor $FET_2$.

After repetition of the above described operation the differential amplifier circuit $K$ reaches a balanced condition at which the gate voltage $V_1$ of the field effect transistor $FET_1$ becomes equal to the gate voltave $V_2$ of the other field effect transistor $FET_2$. The time required to reach the balanced condition is extremely short since the circuits are transistorized.

When transistors $T_8$ and $T_9$ are of the same rating, collector currents $I_3$ and $I_4$ of these transistors are the same or proportional. Accordingly, a current $I_3$ corresponding to the product of the ratio of the outputs of the internal and external electromotive elements $P_1$ and $p_2$ immediately prior to photographing, and the output of the external electromotive element during photographing flows through capacitor $C_2$ connected to the collector electrode of transistor $T_9$. Thus the capacitor $C_2$ is charged with a substantially constant current whereby the voltage $Vc_2$ across capacitor $C_2$ increased linearly. When the voltage $Vc_2$ across capacitor $C_2$ reaches a prescribed value shutter control circuit $F$ operates to close the shutter which has been opened previously by unlatching a latch, not shown. When the shutter is closed in this manner, switches $S_1$, $S_2$ and $S_3$ are returned to their neutral positions, thus completing photographing. In this manner, the shutter is maintained open from an instant at which movable contacts $a$ of switches $S_1$, $S_2$ and $S_3$ are caused to engage contact $b$ to the instant at which the voltage $Vc_2$ across capacitor $C_2$ reaches the prescribed value.

In the above described shutter operating circuit when a film of different sensitivity is to be used, the slidable arm $R$ of variable resistor $Rf$ is varied to vary the charging voltage of capacitor $C_1$.

The shutter operating circuit according to the invention computes the ratio between values of the light measured by the internal and external electromotive elements. The shutter time is determined in accordance with the ratio and the value of the light measured by the external electromotive element when the shutter is open so that it is always possible to accurately determine the brightness of the object while the shutter is open. For this reason, even when the brightness of the object varies it is possible to quickly follow such variation to determine the correct exposure. Further, according to this invention it is possible to measure the brightness with an accuracy comparable with that of the internal lumen measurement at the time of photographing, thus providing an appropriate shutter speed commensurate with the measured lumen by using a purely electronic circuit, with its attendant simplicity of construction, and reduction of size and manufacturing cost. The electronic circuits can withstand vibration and shocks and are self-compensating with respect to temperature.

The invention is not limited to the particular embodiment illustrated and many changes and modifications may be made within the inventive concept.

What is claimed is:

1. An electric shutter operating circuit for a camera comprising
   an external photosensitive electromotive element ($P_2$) disposed in front of the body of said camera;
   an internal photosensitive electromotive element ($P_1$) disposed in position to receive light transmitted through the lens of said camera;
   a source of constant voltage ($E$);
   a first capacitor ($C_1$);
   switching means ($S$, $S_4$) having a first switching position connecting said internal and external electromotive elements ($P_1$, $P_2$) in series opposition and charging said first capacitor ($C_1$) from said source of constant voltage ($E$) through said internal and external electromotive elements ($P_1$, $P_2$) which are connected in series opposition;
   a differential amplifier ($A_1$) having first and second inputs ($Q_1$, $Q_2$) detecting the balanced condition of said first and second inputs, said switching means having a second switching position and also connecting the output of said first capacitor ($C_1$) to said first input ($Q_1$) of said differential amplifier ($A_1$), and connecting said external electromotive element, with its polarity reversed, between the second input ($Q_2$) and the output of said differential amplifier ($A_1$), said switching means changing from said first to said second operated position concurrently with the opening of said shutter of said camera;
   a second capacitor ($C_2$);
   means ($T_2$) to charge said capacitor ($C_2$) in accordance with the output from said differential amplifier ($A_1$), and a shutter control circuit ($F$) responsive to a pre-determined terminal voltage of said second capacitor ($C_2$) to close the shutter.

2. The electric shutter operating circuit as described in claim 1 which further comprises a diode ($D$), and a transistor ($T_1$) connected to pass current through said diode, said transistor ($T_1$) being connected to and controlled by the output from said differential amplifier ($A_1$), said switching means ($S$, $S_4$); when in said second position, establishing a connection to apply the difference between the output of said external electromotive element ($P_2$) and the voltage drop across said diode ($D$) to said second input ($Q_2$) of said differential amplifier ($A_1$).

3. The electric shutter operating circuit as described in claim 2 wherein said differential amplifier ($A_1$) includes a pair of cascade connected field effect transistors ($FET_1$, $FET_2$), the gate electrode of one of the field effect transistors ($FET_1$) being connectable to said first capacitor ($C_1$) through said switching means and the gate electrode for the other field effect transistor ($FET_2$) being connectable to receive said difference voltage between the output of said external electromotive element ($P_2$) and the voltage drop across said diode ($D_2$).

4. The electric shutter operating circuit according to claim 1 wherein said switching means has a neutral position besides the two operating positions, said switching means being interlocked with the shutter release button of the camera such that when the shutter release button is depressed slightly, said switching means is operated to one operating position to connect said first capacitor ($C_1$) to said source of constant voltage (E) through said internal and external electromotive elements ($P_1$, $P_2$), and when the shutter release button is depressed further, said switching means is operated to the other operating position to connect said capacitor ($C_1$) to said first input ($Q_1$) of said differential amplifier ($A_1$) and to concurrently connect the inverted external electro-motive element ($P_2$) with reverse polarity between the output and said second input ($Q_2$) of said differential amplifier ($A_1$).

5. Circuit according to claim 4, wherein the source of constant voltage has a controllable value, the voltage value being changeable to provide an adjustment to the charge on the capacitor ($C_1$) and permit setting of the shutter in accordance with various film sensitivities.

* * * * *

UNITED STATES PATENT OFFICE
CERTIFICATE OF CORRECTION

Patent No. 3750546     Dated August 15, 1973

Inventor(s) Masaya FUJII et al

It is certified that error appears in the above-identified patent and that said Letters Patent are hereby corrected as shown below:

In the heading of the patent, the following should appear:

[30]   Foreign Application Priority Data

June 12, 1970   Japanese application No. 50522/'70

Signed and sealed this 8th day of January 1974.

(SEAL)
Attest:

EDWARD M. FLETCHER, JR.  
Attesting Officer

RENE D. TEGTMEYER  
Acting Commissioner of Patents